3,463,882
ROTATING MIRROR SCANNER
Robert J. Herbold, Sunnyvale, Calif., assignor, by mesne assignments, to Technical Operations, Incorporated, Burlington, Mass., a corporation of Delaware
Filed May 11, 1966, Ser. No. 549,225
Int. Cl. H04n 3/02
U.S. Cl. 178—7.6    10 Claims

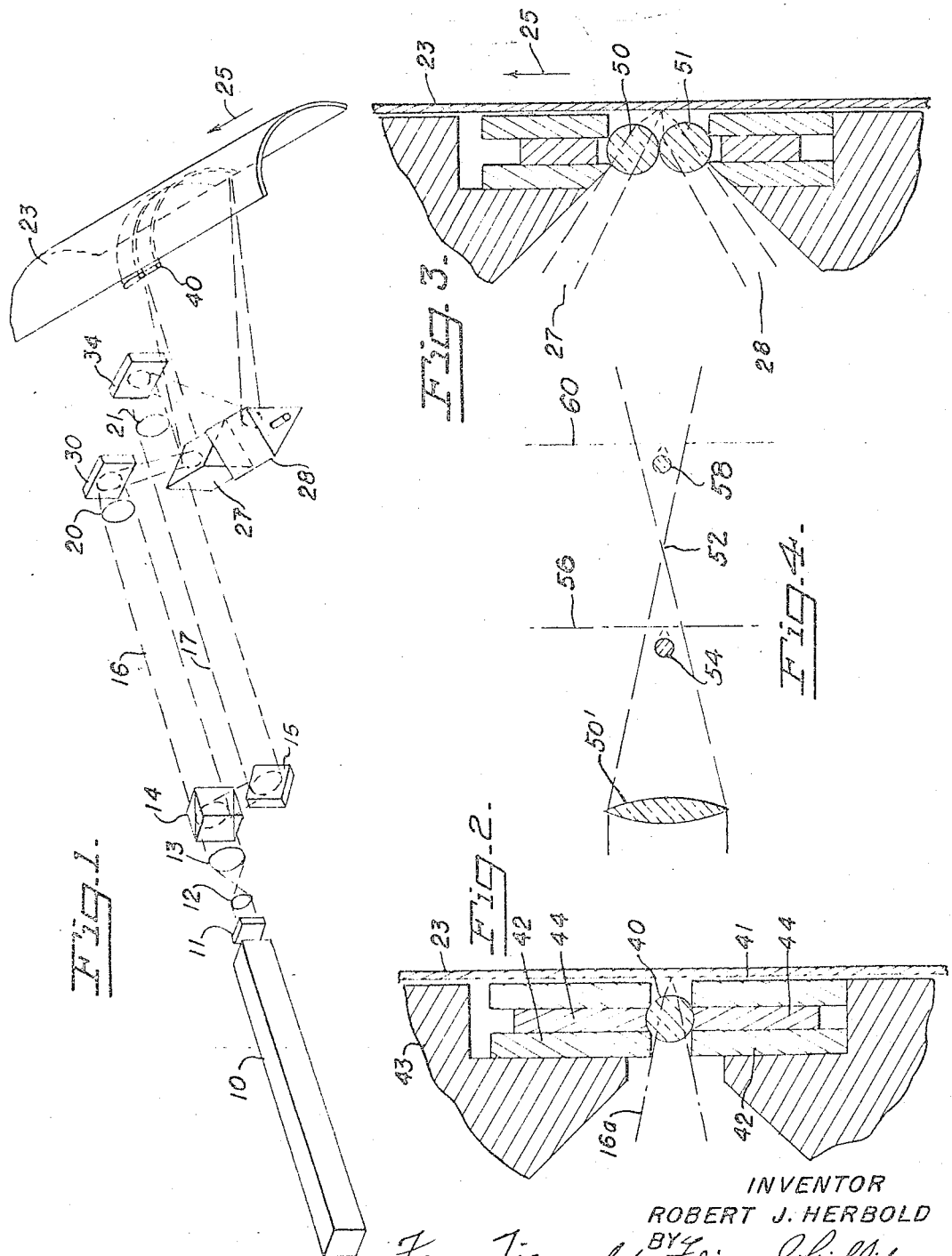

ABSTRACT OF THE DISCLOSURE

This disclosure depicts an optical flying spot scanning system including beam swinging means and a novel anamorphic lens in the form of a filar disposed contiguous to the scan plane in the path of the spot-forming beam for reducing spot jitter transverse to the beam path.

---

This invention relates to rotating mirror scanners of the kind which produce a television type raster and particularly to improvements for overcoming spot jitter which results from mirror imperfections causing angular deviations of the beam in a flying spot laser scanner.

One example of a typical use of the present invention is shown in my assignee's copending application of Willard E. Buck and Randy J. Sherman for "High Speed Facsimile Method and Apparatus," Ser. No. 443,529. The apparatus shown in said application utilizes a multi-faced mirror for sweeping a focused beam of light across a film to produce a raster pattern. This will presently be explained more fully but here it will suffice to understand that separate mirror faces cause a succession of scans and as the film is moved during scanning, the individual scans across the film and progress in closely spaced relationship lengthwise of the film. If the mirror faces are not perfectly formed and parallel to the axis about which they rotate, deviations in the scan path will occur resulting in uneven spacing of even overlap of the paths.

It is the object of this invention to provide means to overcome the above described scan ray jitter and to provide means to overcome this phenomenon without the very costly and tedious task of grinding and polishing the mirror faces to the high degree of perfection required.

Further and more specific objects and advantages of the invention are made apparent in the following specification wherein the invention is described in detail by reference to the accompanying drawing.

In the drawing:

FIG. 1 is a perspective schematic view of the principal optical elements in a flying spot laser scanner;

FIG. 2 is a greatly enlarged fragmentary sectional view taken through a filar lens and its support used in the apparatus disclosed in FIG. 1;

FIG. 3 is a modification of the element illustrated in FIG. 2 employing two filar lenses to prevent a parallax effect which results from the use of a binocular optical system; and FIG. 4 is a schematic view illustrating possible variations in position of the filar in an optical system.

The scanner shown in FIG. 1 is basically the same as that disclosed in the above mentioned copending application and it includes a light source in the form of a laser schematically illustrated at 10. The beam of light from the source 10 may be modulated by a device illustrated at 11 which may be a Kerr cell or other similar device capable of receiving singals representing varying intensity of light and capable of modulating the beam from the light source to correspond with the signal. The purpose of this, as is fully explained in the above mentioned application, is to enable the scanner of FIG. 1 to reproduce a record on film which is being scanned by another device at a remote location. The modulated beam is passed through a lens system comprising lenses 12 and 13 to convert the very narrow laser beam momentarily to a considerably wider beam of collimated light which is intercepted by a beam splitter 14 herein disclosed as the type having a half mirrored surface disposed at an angle to the beam so that one-half of the light is permitted to pass through the surface while the other half is reflected toward one side where it is intercepted by a mirror 15. The two beams thus produced are shown at 16 and 17 and are directed toward lenses 20 and 21, respectively, which focus them to very small points through a mirror system to be described and substantially at the surface of a strip of film represented at 23. This strip of film is fed as from one reel to another and is driven to move constantly in the direction of the arrow shown at 25.

At a point between the two reels and where the focused beams of light scan the surface of the film, the film is confined by means (not shown) to a curved configuration, the curve being defined by the point of focus of the light beam as it is reflected from the surfaces of either of a pair of rotating triangular mirrors shown at 27 and 28. These mirrors rotate at high speed on a common axis and are usually driven either by a turbine or by an electric motor (not shown).

The beam of light 16 after being focused by the lens 20 passes (as shown in FIG. 1) to a mirror 30 which directs it toward the rotating mirror 27. One face of this mirror causes the focused point of the beam to sweep across the surface of the strip of film 23 to produce a single scan of a raster. The sweep of this beam is 120° and since the mirrors 27 and 28 are formed as equilateral triangles, the instant that one mirror stops writing through this 120° sweep, the other mirror will start because, as seen in the drawing, the other part 17 of the split beam is focused by a lens 21 to a mirror 34 which directs it to the rotating mirror 28 to be swept across the surface of the film strip. The speed of travel of the film strip is such that the line exposed or written on the film by the two mirrors acting alternately is immediately adjacent the line before it with a consequence that modulation of the intensity of the beam in accordance with a record on a remotely positioned film will produce a facsimile or duplicate of the record on the film in the machine described.

It has been found that the manufacture of rotating mirrors suitable for use in the above-described apparatus is extremely difficult because any deviation from a plane which is parallel to the axis of rotation will cause the mirror to direct the focused spot away from the intended scan line in a direction longitudinally of the film. This results in jitter or random spacing which, if excessive, is intolerable. Investigation with one apparatus using triangular mirrors that were sufficiently perfect for other optical uses showed random spacing as high as 50 microns with a focused scanning spot having a diameter of 5 microns. Costly and time-consuming balancing and polishing of the mirrors used has reduced such random spacing to 15 to 20 microns, but far greater accuracy has been achieved by the practice of the present invention which utilizes an anamorphic lens in the form of a filar lens between the collecting or focusing lenses and the film surface. Such a lens is illustrated at 40 in FIG. 1, and also shown greatly enlarged in FIG. 2. It has been learned that glass and quartz fibers used optically for various purposes, say from 1 to 500 microns in diameter, make excellent cylindrical lenses which will focus exterior to themselves when illuminated perpendicular to their axes with a cone of light. As shown in FIG. 2, the filar 40 is mounted between the edges of two pairs of thin metal strips 41 and 42 supported in any suitable housing member 43 and spaced by shims 44 to which they are preferably adhesively secured. This entire assembly with the filar follows the curvature of the film, and is very slightly spaced therefrom so that the focal point or focal line of the filar occurs at the surface of the film. In FIG. 2 the focused beam from one of the lenses 20 or 21 is illustrated, after having been intercepted and swung by one of the rotating mirrors, at 16A. This beam converges upon the filar 40 which has a very short focal length and is converged thereby to a spot at the film surface. The difference of the image motion in the image produced by the filar relative to that produced by the lens has proven to be greater than 10 to 1 in the apparatus described and, consequently, the random spacing produced as a result of slightly imperfect mirror faces has been reduced to less than five microns or one spot diameter.

The assembly shown in FIG. 2 may prove unsatisfactory for some purposes due to the occurrence of parallax which results from the binocular or split beam system illustrated in FIG. 1. For example, when light comes to the filar from two directions as it will from the two mirrors 27 and 28 in FIG. 1, it will be focused on the film of image plane in two different positions spaced apart longitudinally of the film. This does not present a disadvantage if the record being scanned or reproduced on the film of the present device uses a similar optical system, because in producing a record with a raster it makes little difference which scans of the raster occur first or in what order they occur. It is possible, however, to use the system of FIG. 2 without producing parallax by employing, as shown in FIG. 3, two filars 50 and 51 in place of the single filar 40 of FIG. 2. In this case the filars are supported and spaced from the film in much the same manner as shown in FIG. 2, but each intercepts converging beams from the mirrors 27 and 28 represented here at 27A and 28A, and these beams are focused at the same point or line on the image plane.

Referring again to FIGS. 2 and 3, the cones of light 16A, 27 and 28 are schematic representations and are intended to denote the portion only of cones from a focusing lens which penetrates and is focused by the filar. In practice, the filar is disposed at a position within the cone where the diameter of the cone exceeds that of the filar. For example, in FIG. 4, a lens 50' focuses light to a point 52 and a filar 54 is disposed within the focused beam in advance of that point and in a position where the conical beam is larger than the filar. This permits deviation of the beam without reducing the quantity of light entering and focused by the filar. The position of the filar should be such that it remains within the beam when deviation occurs. Consequently, the intensity of the spot focused by the filar at the plane 56 will not be varied as a result of deviation.

It is also possible and in some cases desirable to locate the filar in the diverging rather than the converging part of a focused beam. This is illustrated in FIG. 4 wherein a second filar 58 is shown in an alternative position beyond the focal point 52 to produce a focused point at a plane 60. In either position of the filar illustrated in FIG. 4 it receives less than the total light in the focused beam but limited beam deviation does not vary the intensity of light passing through the filar.

Since the filar is cylindrical is produces an astigmatic effect, and the image produced at the film plane is a line rather than a dot or disc. This is undesirable since obviously it reduces the fidelity of the record which is made. This undesirable effect can be corrected by astigmatizing the cones imaged by the spherical lenses 20 and 21. The present invention avoids the high cost of custom made astigmatic lenses to correct this phenomenon by mounting the lenses 20 and 21 off axis or at slight angle from the ordinary position in which the central plane of the lens is normal to the axis of the beam. This angularity introduces astigmatism which counteracts the astigmatic effect of the cylindrical filar.

I claim:

1. In a rotating mirror scanner in which a focused beam is swept across an image plane by a moving mirror surface to produce a raster, means to reduce the magnitude of random spacing between individual scans comprising a anamorphic lens of small cross-section disposed continuous to the image plane in a position to receive the beam and focus it at the image plane.

2. The invention of claim 1 in which separate rotating mirror surfaces are used.

3. The invention of claim 1 in which the anamorphic lens extends across the image plane in the direction of the sweep and is parallel to the image plane.

4. The invention of claim 1 in which the anamorphic lens is positioned to receive less than all of the light in the focused beam.

5. The invention of claim 4 with means for supporting said anamorphic lens and for masking the light at both edges thereof, said means comprising two pairs of plates disposed parallel to said plane to be scanned, one pair on each side of said anamorphic lens, the plates in each of said pairs of plates being spaced a distance less than the diameter of said anamorphic lens, said anamorphic lens being captured and supported between said pairs of plates.

6. The invention of claim 1 in which the beam to be focused is split and has its two parts focused and directed toward the image plane at converging angles, and a separate anamorphic lens intercepting each focused part of the beam in a position to refocus both at the same point at the image plane to prevent parallax.

7. The invention of claim 1 in which a lens is used to focus the beam and in which the lens is mounted at an angle to its axis which compensates the astigmatic effect of the anamorphic lens.

8. The invention of claim 1 in which the filar is disposed in the converging portion of the beam so remote from the focal point thereof that the beam is of greater diameter than the filar.

9. The invention of claim 8 in which the filar is disposed in the diverging portion of the beam.

10. A flying spot optical scanning system comprising:
means for deflecting an input light beam across a surface to be scanned; and
anamorphic lens means located in the locus of said beam as it traverses said surface to be scanned with its axis lesser power being parallel to said locus, said anamorphic lens means being disposed contiguous to said surface to be scanned, said lens means serving to reduce jitter in said beam in a direction transverse to said locus.

References Cited

UNITED STATES PATENTS

| 1,870,465 | 8/1932  | Rathbun.   |         |
|-----------|---------|------------|---------|
| 2,045,921 | 6/1936  | Peck       | 178—7.6 |
| 2,059,221 | 11/1936 | Fessenden  | 178—7.6 |
| 2,464,793 | 3/1949  | Cooke.     |         |
| 2,560,614 | 7/1951  | Walker     | 178—7.6 |

ROBERT L. GRIFFIN, Primary Examiner

B. LEIBOWITZ, Assistant Examiner

U.S. Cl. X.R.

178—7.1

PO-1050
(5/69)

UNITED STATES PATENT OFFICE
CERTIFICATE OF CORRECTION

Patent No. 3,463,882                Dated August 26, 1969

Inventor(s)     Robert J. Herbold

It is certified that error appears in the above-identified patent and that said Letters Patent are hereby corrected as shown below:

Column 4, claim 1, line 11, "continuous" should read --contiguous--; and

Column 4, claim 8, line 43, "filar" should read --anamorphic lens--.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents